United States Patent
Callard

(10) Patent No.: US 9,930,145 B2
(45) Date of Patent: Mar. 27, 2018

(54) SYSTEM AND METHOD OF HEADER COMPRESSION FOR ONLINE NETWORK CODES

(71) Applicant: Huawei Technologies Co., Ltd., Shenzhen (CN)

(72) Inventor: Aaron Callard, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/723,327

(22) Filed: May 27, 2015

(65) Prior Publication Data

US 2016/0352871 A1    Dec. 1, 2016

(51) Int. Cl.
*H04J 3/24* (2006.01)
*H04L 29/06* (2006.01)

(52) U.S. Cl.
CPC .................................... *H04L 69/04* (2013.01)

(58) Field of Classification Search
CPC combination set(s) only.
See application file for complete search history.

(56) References Cited

U.S. PATENT DOCUMENTS

| | | | |
|---|---|---|---|
| 9,271,123 B2 * | 2/2016 | Medard | H04W 4/06 |
| 2005/0190719 A1 | 9/2005 | Lee et al. | |
| 2009/0238097 A1 * | 9/2009 | Le Bars | H04L 45/04 370/254 |
| 2009/0310622 A1 | 12/2009 | Whited et al. | |
| 2014/0112352 A1 * | 4/2014 | Li | H04L 69/161 370/474 |

FOREIGN PATENT DOCUMENTS

| | | |
|---|---|---|
| CN | 1875558 A | 12/2006 |
| CN | 101369977 A | 2/2009 |
| WO | 2015068914 A1 | 5/2015 |

OTHER PUBLICATIONS

Wu, Y. et al., "The Implement of ROHC Protocol in Mobile IPv6 Network," Modern Science & Technology of Telecommunications. Nov. 30, 2005, pp. 10-13.
Barros, J., et al., "Effective Delay Control in Online Network Coding," IEEE INFOCOM, Apr. 19-25, 2009, pp. 208-216.

(Continued)

*Primary Examiner* — Frank Duong
(74) *Attorney, Agent, or Firm* — Slater Matsil, LLP

(57) ABSTRACT

Embodiments are provided for header compression with online network codes. A header formulation is used in accordance with the network codes to reduce the header overhead. An agent node between a source of packets and a user equipment (UE) adds to a header in the packets block labels corresponding to blocks of data in the packets. The agent node further adds, to a payload portion of the packets, start and end times for transmitting the blocks. The blocks of data are encoded using an online network coding scheme and the packets are sent to an access node serving the UE. The access node receives the packets, compresses the header by compressing bits of the block labels based on a predefined finite number of paths between the agent node and a plurality of access nodes components serving the UE, and sends the compressed header in the packets to the UE.

28 Claims, 6 Drawing Sheets

(56) References Cited

OTHER PUBLICATIONS

Li, X., et al, "Cooperative Communications Based on Rateless Network Coding in Distributed MIMO Systems [Coordinated and Distributed MIMO]," IEEE Wireless Communications, vol. 17, No. 3, Jun. 2010, pp. 60-67.

Sardari, M., et al., "Multilevel Diversity Coding via Rateless Codes for Reliable and Scalable Video Multicasting," IEEE Communications Letters, vol. 17, No. 5, May 2013, pp. 956-959.

Sundararajan, J., et al., "Interfacing Network Coding With TCP: An Implementation," CoRR, Informal Publication, Aug. 11, 2009, arXiv preprint arXiv:0908.1564.

\* cited by examiner

SYSTEM AND METHOD OF HEADER COMPRESSION FOR ONLINE NETWORK CODES

TECHNICAL FIELD

The present invention relates to networking and wireless communications, and, in particular embodiments, to a system and method of header compression for online systematic network codes.

BACKGROUND

High traffic demand is a challenge in modern wireless communication systems, due to limited network resources and bandwidth. Systems such as heterogeneous networks (HetNet) have been proposed to address this and other challenges. HetNet uses the deployment of an additional layer of lower power pico-cells in addition to the macro-cell to achieve cell splitting gain. Another approach to improve gain is using coordinated multipoint (CoMP) traffic management schemes. Other schemes are used to provide cell load balancing and interference mitigation. The schemes may also use cells with different Radio Access Technologies (RATs), such as schemes that offload Radio Access Network (RAN) traffic to WiFi networks. Further, coding and compression schemes are used to reduce the amount or delay of transferred data and hence improve bandwidth utilization. Improved coding and compression schemes to yield higher gain are needed as the amount of traffic continues to grow.

SUMMARY OF THE INVENTION

In accordance with an embodiment, a method performed by a network component includes adding to a header in a plurality of packets a plurality of block labels corresponding to a plurality of blocks of data in the packets, and further adding, to a payload portion of the packets, start and end times for transmitting the blocks. The blocks of data including the payload portion are encoded using an online network coding scheme. The packets including the header and the blocks are sent to an access node serving a user equipment (UE).

In accordance with another embodiment, a network component comprises at least one processor and a non-transitory computer readable storage medium storing programming for execution by the at least one processor. The programming includes instructions to add to a header in a plurality of packets a plurality of block labels corresponding to a plurality of blocks of data in the packets, and further add, to a payload portion of the packets, start and end times for transmitting the blocks. The programming includes further instructions to encode the blocks of data including the payload portion using an online network coding scheme. The network component is configured to send the packets including the header and the blocks to an access node serving a UE.

In accordance with another embodiment, a method includes receiving, on a path between a network and the network component, a plurality of packets including a header. The header includes a plurality of block labels corresponding to a plurality of encoded blocks of data in the packets. The method further includes compressing the header by compressing bits of the block labels based on a pre-defined finite number of paths between the network and a plurality of network components serving a UE including the network component. The compressed header in the packets is sent to the UE.

In accordance with another embodiment, a network component comprises at least one processor and a non-transitory computer readable storage medium storing programming for execution by the at least one processor. The programming includes instructions to receive, on a path between a network and the network component, a plurality of packets including a header. The header includes a plurality of block labels corresponding to a plurality of encoded blocks of data in the packets. The programming includes further instructions to compress the header by compressing bits representing the block labels based on a pre-defined finite number of paths between the network and a plurality of network components serving a UE including the network component. The network component is configured to send the compressed header in the packets to the UE.

In accordance with another embodiment, a method includes receiving, on a path from a network component, a plurality of packets including a header, wherein the header comprises compressed bits, and retrieving, using the compressed bits, a plurality of block labels corresponding to a plurality of encoded blocks of data in the packets. The block labels are retrieved in accordance with knowledge of the path from the network component.

In accordance with another embodiment, a network component comprises at least one processor and a non-transitory computer readable storage medium storing programming for execution by the at least one processor. The programming includes instructions to receive, on a path from a network component, a plurality of packets including a header, wherein the header comprises compressed bits. The programming includes further instructions to retrieve, using the compressed bits, a plurality of block labels corresponding to a plurality of encoded blocks of data in the packets. The block labels are retrieved in accordance with knowledge of the path from the network component.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A promising approach to address the high traffic challenge is using dynamic point selection (DPS) as a mechanism to provide cell load balancing and interference mitigation. In DPS, data is made available at several points (radio transmission nodes or base stations) but only sent from one location at any one time. The points can belong to different radio access technologies (RATs), such as Long Term Evolution (LTE) evolved Node B (eNB), Femto-cell (low power base station), WiFi access point (AP), other RAT nodes, or combinations thereof. The DPS scheme allows the dynamic selection of transmitting points to serve users with a minimum amount of traffic. For example, the transmission points can include one or more eNBs, Femto-cells or pico-cells, WiFi APs, or other radio access nodes. Once a suitable point is selected, the traffic data is sent down a single path corresponding to that point.

To further improve performance gain (e.g., gain defined in terms of traffic delivery over limited resources/bandwidth), coding schemes such as network codes or online network codes can be used, where blocks of data are encoded and then decoded together. Improving the efficiency of such coding schemes further improves the gain in the system. Disclosed herein is a system and method for using header compression with systematic network codes for communications in wireless networks, such as within the context of a DPS system.

The systematic network codes are used for encoding the data to provide significant gain. However, such codes may also require significant overhead. The network coding requires sending on the link a relatively small additional amount of data, along with the actual data designated for reception by the user. The additional data is needed to provide redundancy for correcting errors in the received data at the user. In embodiments herein, a novel header formulation is used in accordance with the network codes to reduce the header overhead. Specifically, considering a fixed multipath scenario, such as the paths to the multiple transmission points in a DPS system, the fixed number of known paths is exploited. As such, a considerable amount of information in the header can be known without the need of explicit signaling between the network and user. This information can be removed from the header, allowing for header compression, as described further below. The header formulation can be adapted to a robust overhead compression (RoHC) scheme, which is used to further improve gain.

Figure 1:
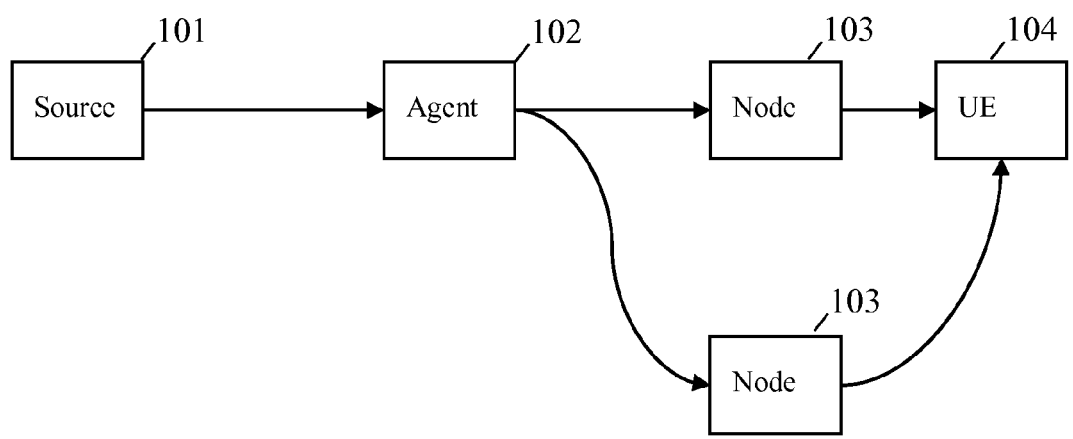
FIG. 1 is a diagram illustrating an embodiment of a system implementing DPS.

FIG. 1 shows an embodiment of a system implementing DPS. The system comprises a source 101 for data, which can be a server, a network, a data storage, a content generator, or any network node that generates or forwards data. The data can be user data (e.g., for user consumption), network control data, other information forwarded in the network, or combinations thereof. The system also comprises a plurality of access nodes 103 (or points) that serve a user equipment (UE) 104. The access nodes 103 are labeled as "nodes" in FIG. 1. The access nodes or points can include various RAT nodes, as described above. The UE 104 can be any user communication device capable of wireless communications (e.g., RAN communications, WiFi communications, or both), such as a smart phone, a computer tablet, a mobile phone, a laptop or desktop computer, a sensor device, or others. The different points can be linked in the backhaul with some kind of constrained links, which could be lossy, jittery, or rate limited. For example, femtocells may receive transmissions from a wireless network over a third party Internet Protocol (IP) network.

Additionally, an agent node 102 is an intermediary node positioned between the packet source 101 and the access nodes 103 serving the UE 104. The agent 102 is controlled by a central coordinating entity and is in charge of breaking the data from the source 101 into network code blocks (e.g., as packets) and dividing the blocks between the access nodes 103 (transmission points). For example, the agent 102 can be a server, router, bridge, switch, or any suitable network controller. In this DPS system, each access node 103 or point can feed back, to the agent 102, the expected rate and the expected time before this point would start sending blocks to the UE 104. According to the feedback, the agent 102 sends to each access node 103 a quota of blocks. The access nodes 103 may then transmit their blocks using their respective scheduling strategies. As scheduling occurs, each access node 103 updates the agent 102 with the rate that actually occurred (actual rate), as well as the updated expected start and end times for sending that access node's current blocks. Based on the updated expected times, the agent 102 can reassign various blocks that have not been started yet.

Figure 2:
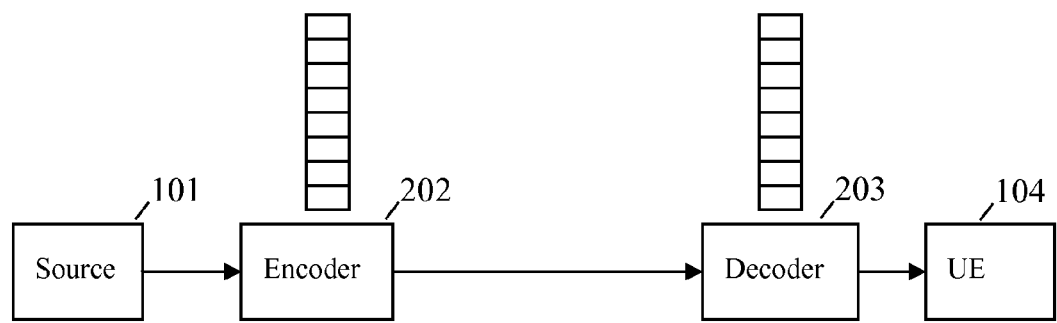
FIG. 2 is a diagram illustrating an embodiment of system using systematic network codes.

FIG. 2 shows an embodiment of a system using network codes. The system can be part of the system of FIG. 1 above. In FIG. 2, an encoder 202 generates network codes. The encoder 202 can be positioned at the agent 102, for instance. In other embodiments, the encoder 202 is at the access node 103, or any other intermediate node between the source 101 and the UE 104. The network codes are implemented as a block code. This means that, in order to encode data, the encoder 202 needs to receive and encode a predetermined number of blocks, which in turn must all be received and processed together at the decoder 204 (which may be at the UE 104). However, this can impact the latency (delay) associated with the data packets. For example, assuming that M blocks of data are encoded together by the encoder 202, the encoder 202 needs to wait until the M blocks have been received by the UE 104 before the encoder 202 begins sending additional blocks. The decoder 204 also needs to wait until M blocks have been received to begin decoding the data blocks. If the block sizes are relatively large, this can cause significant delay, which may not be feasible or acceptable. Thus, in an embodiment, a variation of network codes can be used, where non-coded bits (without network coding) or packets are initially sent. If a last sent packet is reported lost (or not received) by the receiver, the packet is then encoded and resent. The encoding corresponds to a combination of the lost packet and an earlier successfully sent packet. The receiver decodes the lost and resent packet (retrieve the resent packet from the combination) using knowledge of the earlier sent packet. This is referred to herein as a systematic network code. This approach can significantly reduce the average delay in the data packets.

In an embodiment, the header of the M blocks with the systematic network codes can be formulated to adapt to a RoHC scheme, which is an efficient header compression scheme. For instance, the header may be formulated at the source or the agent in the DPS system. The header compression can be implemented at the nodes. Typically, network codes do not allow for efficient header compression or RoHC. Therefore, a suitable formulation of the header is needed. Using the systematic network codes (instead of typical network codes) enables such formulation. The resulting header may have some relatively small additional overhead, for example about 1 byte in a worst case scenario. The formulation is based on the assumption that the systematic network codes are source or node specific, e.g., have a source/path known to the receiver (e.g., UE). For example, the receiver detects the reception on one of a LTE or a WiFi connection. The start and end times, typically included in the header for sending blocks for a flow (e.g., the M blocks), are not needed until the payload (e.g., M blocks) is decoded. Thus, the start and end values, also referred to as Transmission Control Protocol (TCP) start and end values, can be combined with the payload part of the blocks instead of the header portion. The amount of information (bits) that is moved to the payload can be reduced using the systematic network coding on the payload.

In typical block based network coding, the different blocks are distinguished by placing their coding coefficients consecutively in a bitmap. For online schemes, there are potentially an infinite number of possible blocks. Hence, a circular buffer like TCP is likely to be used in practical implementations, which prevents using the standard bitmap scheme. In an embodiment, this limitation of online schemes is addressed using a sparse representation of the bitmap. Specifically, each block is labeled using a unique identifier, also referred to herein as the block label or index. The label values are then placed in order, e.g., in a bitmap, in the header. If byte alignment is needed, then each block identifier can be limited to X bytes or bits (X is a predetermined integer). This can limit the maximum number of unknown packets to $256^X$. In an embodiment, differential coding can also be used with bite alignment, without significant adverse effect on flexibility. In this case, the block identifiers are placed in order and the differences between them (instead of the absolute values) can be used. Additionally, the difference values can be wrapped around a maximum value to keep the maximum difference smaller. The maximum difference may be set to a small number without loss, and thus only fractions of a byte (less than 8 bits) are needed to represent the block identifier.

The above header formulation can have a fixed overhead independent of the difference in values between consecutive labels. The labels are likely to have consecutive or near consecutive values. Thus, a high probability of small label values is expected, which allows further header compression in accordance with such probabilities for the labels. The probabilities can be fixed probabilities that are predefined or updated probabilities in real time. With variable header size, a standard arithmetic coding, such as Huffman coding, can be used to generate the mappings of probabilities to bits. Because of the desire for byte alignment, and a desire for simplicity over optimality, simple encodings are typically adopted. In an embodiment, a predetermined number (integer) of Y bits is used to indicate the block label. In an embodiment, the Y bits can also be set to a predefined value, e.g., all zero bits (00 . . . 00), to indicate adding a value of $2^y$ to the next block label. Thus, a large value Y can be represented without always using a large number of bits. For example assuming Y=8, the 8 binary representation would be used to represent the numbers from 0 to 254, while the number X from 255 to 510 would be represented by [1 1 1 1 1 1 1] followed by the Y bit binary for the number X−254. Other options can also be used. However, with using adaptive block length, there is no longer a one to one mapping between the number of packets (blocks) and the header size. In this case, the header size grows each time a number larger than $2^y-1$ is used. Furthermore this entire field needs to be processed to determine the header size. This is undesirable and makes parallel processing of the headers more challenging. An additional field indicating the header length can be added to remove this constraint.

In an embodiment, there can be some additional redundancy between a base field in the header and the blocks' indices (block IDs or labels), which can be exploited to further improve gain. The base field indicates the earliest or last fully decoded block, which essentially indicates that the blocks labels preceding this indicated block can be dropped. The maximum distance between the base field indicated block and the first block label after the indicated block can be relatively small, and hence another form of differential encoding can be used without considerable loss. Table 1 below shows an embodiment of a header formulation before header compression. The last fields for start and stop values are moved from the header to the payload portion. Other suitable embodiments of the header that include the block labels are also possible.

TABLE 1

Header formulation

| Name | Size | Descriptions |
| --- | --- | --- |
| Source Port | 2 bytes | As TCP |
| Destination Port | 2 bytes | As TCP |
| Base | X bits | A number representing the last fully decoded byte. Any packet that holds data previous to this can be dropped. The maximum number of blocks is defined by the value of X. |
| N | 1 byte (or 0 bytes if implicit) | The number represents the number of blocks/packets that are contained in this payload. It can be explicitly or implicitly indicated in flowing fields, using a stopping message (e.g., a predefined integer z of ones in a row means end) |

TABLE 1-continued

Header formulation

| Name | Size | Descriptions |
|---|---|---|
| Block Label 1 | Y bits | The first block label representing a number from 0 to $2^Y - 1$, differentially encoded with Base. Thus the actual block id = Base + block label. |
| Coding Coefficient for Block 1 | 1 byte | |
| Block Label 2 | Y bits | The second block label differentially encoded with previous label. |
| ... | | |
| Block Label N | Y bits | |
| Start and Stop (coded in payload) | 6 bytes | Moved from header to payload. This is a combination of the start and stop positions of all messages in this payload. |

The above header formulation can use about 8+1.2 N bytes of information. Such header may increase the size of the packet beyond what lower layers where originally built for, e.g., the header may not fit well in lower layer packeting schemes. For small packets (e.g., voice over IP packets), the header formulation above may be too large. In an embodiment to reduce the header size further, a RoHC like scheme can be used. The target is to reduce the header size, for instance, to about 2 to 4 bytes in total. This can be achieved with RoHC by predicting what the data will be on both sides of the link, and thus sending a hash of that information, along with some differential coding. The hash is used on the receiving side as a check or confirmation that the prediction is behaving correctly. In order for a similar approach to be used for network headers, the behavior should be predictable. The predictable portions can be removed and then predicted at the receiver. As shown in Table 2 below, the header can be broken down into portions that are predictable and other portions that are deemed unpredictable. The determination is based on the assumption that the receiver is aware of which base station (e.g., eNB) it receives packets from, e.g., the RoHC is done on a per hop basis. This is referred to herein as source or node specific.

TABLE 2

Header predictable information

| Source Port | Static and predictable |
|---|---|
| Destination Port | Static and predictable |
| Base | Not used at end link (known by the receiver, e.g., UE) and can be removed completely |
| N | The number of blocks |
| Block Label 1 | Depends on scheduling strategy |
| Coding Coefficient for Block 1 | If taken from an agreed upon pseudo random distribution, can be known |
| Block Label 2 | Depends on scheduling strategy |
| ... | |

The scheduling strategy, e.g., by the agent, may have only a limited number of options. For instance, for a first transmission (in a session or a stream of packets), the block can be sent without coding. Alternatively, all blocks from label X to label Y can be sent with agreed upon coding coefficients, where X and Y are predictable, e.g., have known values based on the path or according to the sending nodes. This could be indicated using only few bits of data, which would set the overhead to levels similar to RoHC, but can add restriction on the network coding level. For example, the network coding can be restricted to always encode all packets from point A to B together using coding coefficients that are a deterministic function of the path for last hop (e.g., to the UE). Thus, the only information needed is the last block label used. This can be expressed as a differential value from the last transmission on this path, or from the last 'base' acknowledged from the UE.

The header formulation above can be adapted to RoHC and may increase the overhead by a relatively small amount, such as about 1 byte for a worst case scenario. In other scenarios, the formulation does not increase the overhead. Even with the header overhead introduced by the formulation above, the systematic network codes used in the data portion (payload) of the blocks significantly reduces (e.g., by about 30 to 40 bytes) the amount of data needed to ensure redundancy for the DPS system. Thus, there is an overall gain in using the combination of systematic network codes and the header formulation and compression described above in terms of gain, e.g., to reduce delay or improve bandwidth utilization. The gain in resources translates to supporting higher traffic in the system.

With the header formulation above, the embodiments herein allow a two stage header compression, where both network coding and further header compression (e.g., RoHC) can be used. The header formulation includes moving the start and stop information bits from the header to the payload of the packets, and adding the block labels to the header. The block labels can have consecutive values, and in an embodiment, can have a fixed difference between the consecutive values. Additionally, at least some of the information in the header is mapped to the source node or the path for sending the packets to the UE. For instance, the coding coefficients for the block labels can be a function of the path or the node. In an embodiment, the block labels can be a known function of the node or path. A RoHC can then be designed given the header formulation. The bit representation of the header can include a path ID. Hence, assuming a limited number of paths to the receiver or UE (e.g., a LTE link and a WiFi link), the possible values for the path ID are limited, which simplifies predicting the coding coefficients (as function of nodes or paths) and improves the header compression efficiency. Further, differential values can be used for the fields in each packet with respect to a previously sent packet, which also improves compression efficiency. In an embodiment, the coding coefficients can be a function of the block labels or a function of a fixed differential value between the consecutive block labels. These schemes reduce the bits of the coding coefficients, and improve compression.

While RoHC corresponds to a scheme of header compression, the term RoHC or header compression is used herein to refer to any header compression scheme in which the header, or some part of the header, is predicted based on transmitted data. A hash value of that predicted header is then calculated. This hash value is compared to a field in the compressed header. If the hash value matches the field, then the predicted header fields are assumed correct. Otherwise, some reconstruction protocol can be applied, e.g., by retransmission.

Figure 3:
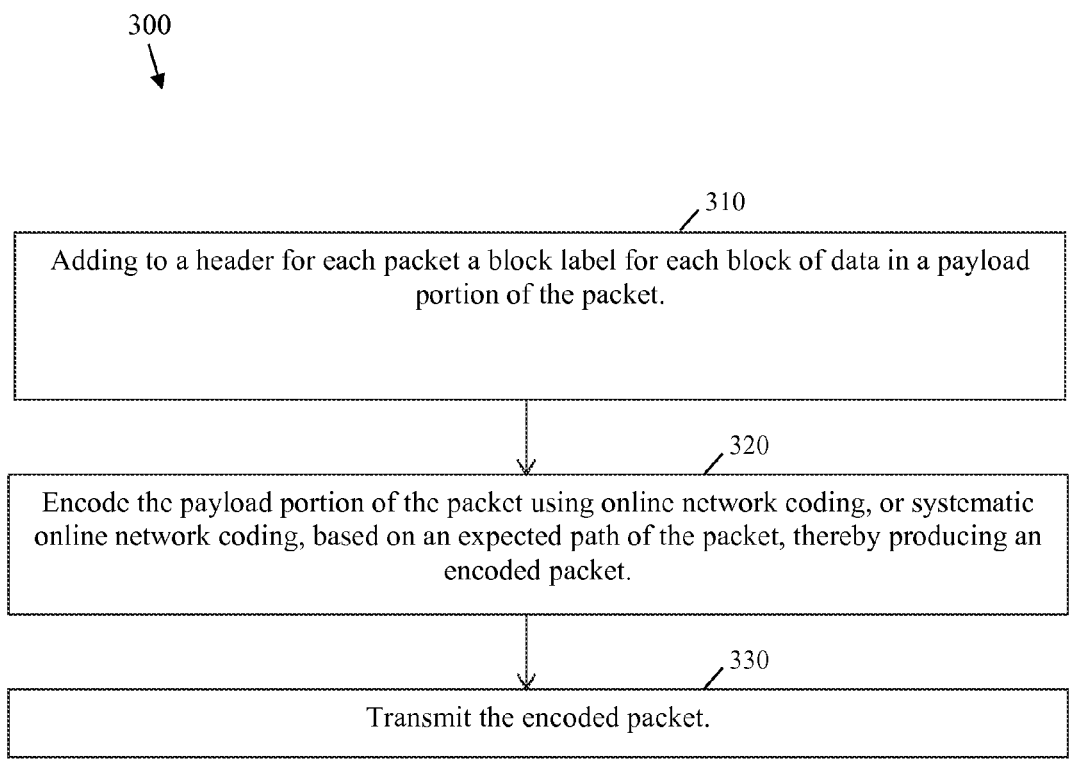
FIG. 3 is a flow diagram illustrating an embodiment method by a source or agent node using online network codes.

FIG. 3 shows an embodiment method 300 of using online network codes. The method 300 can be implemented by a source node (e.g., the source 101) that transmits packets intended for a UE, or by an intermediary node (e.g., the agent node 102) positioned between the source node and an access nodes serving the UE. The method assumes a limited number of paths or access nodes that serves the destination receiver, e.g., UE. For example, the number of paths can be about 2 or 3 paths. Additional paths can also be supported. At step 310, a block label is added to a header of each packet. The block label corresponds to a block of data in the payload portion of the packet. The payload may comprise one or more blocks of data. The header may also indicate the number (M) of blocks that are encoded together in the payload, and respectively the number of block labels included in the header. The header may also include the coding coefficients for encoding the blocks in the encoded payload, which allow the UE to decode the blocks. Additionally, the header can include the source and destination ports, and the base acknowledged by the destination or end receiver. As indicated above, the start and end time values for transmission can be added to the payload instead of the header in the packets. At step 320, the payload portion of the packet is encoded using online network coding, or systematic online network coding, based on an expected path of the packet, thereby producing an encoded packet. For instance, the payload portion is encoded as such based on knowledge of a last hop from a network node to the UE. This can be achieved, for example, by using a coding coefficient for encoding as a deterministic function of the last hop information. At step 330, the encoded packet is transmitted, for instance to an access node of a DPS system that serves the UE.

Figure 4:
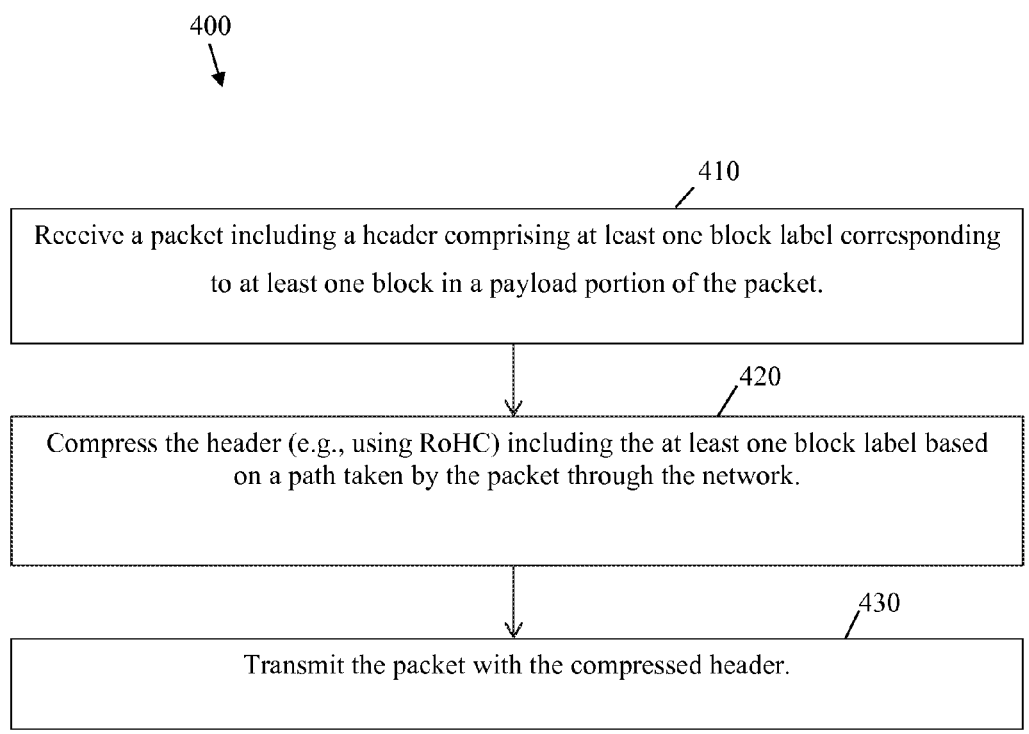
FIG. 4 is a flow diagram illustrating an embodiment method by an access node serving a user equipment (UE) for performing header compression with online network codes.

FIG. 4 shows an embodiment method 400 for performing header compression with online network codes. The method 400 can be implemented by an access node (e.g., the access nodes 103) that serves a UE. The access node may be one hop away from the UE, such as a transmission point. At step 410, the access node receives a packet including a header. The header comprises at least one label corresponding to at least one block in a payload portion of the packet. At step 420, the header is compressed (e.g., using RoHC) including the at least one block label based on a path taken by the packet through a network. In an embodiment, a header compression scheme can be used, such as RoHC, in accordance with the scheduling strategy of the system. For example, the predictable fields in the header can be removed assuming a fixed multipath scenario, i.e., based on a predefined finite number of paths between the network and multiple nodes serving the UE. This includes removing the bits for the source and destination ports and the base. The block labels can also be removed, where the values are predictable or known to the receiver based on the sending node or forwarding path to the receiver. This step can also include adding a path ID to indicate the path to the receiver. In an implementation, the coding coefficients can be removed, where the coding coefficient values are retrievable by the receiver using a known function of the path. At step 430, the access node transmits the packet with the compressed header to the UE.

Figure 5:
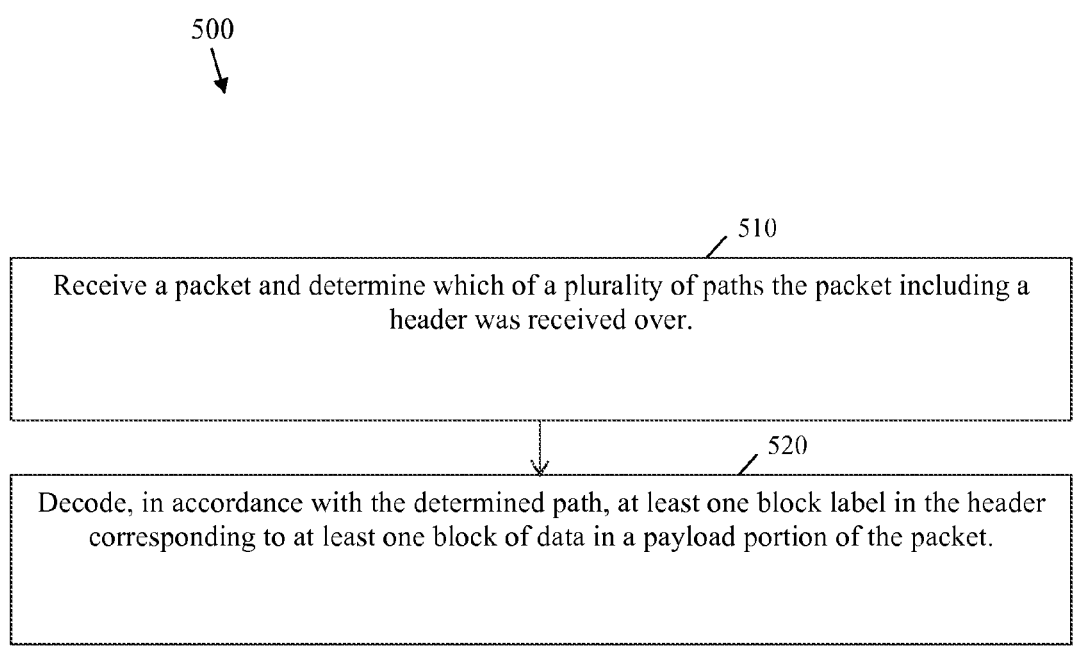
FIG. 5 is a flow diagram illustrating an embodiment method by a UE for receiving and processing packets encoded with header compression and online network codes.

FIG. 5 is a flow diagram illustrating an embodiment method for receiving and processing packets encoded with header compression and online network codes. The method 500 can be implemented by a UE receiving packets. At step 510, the UE receives a packet, and determines which of a plurality of paths the packet including a header was received over. The header can be compressed using a compression scheme (e.g., RoHC). The UE may be capable of receiving the packet over a plurality of wireless paths (wireless links), for example two RAN links and a WiFi link, or two WiFi links and a RAN link. At step 520, the UE decodes, in accordance with the determined path, at least one block label in the header corresponding to at least one block of data in a payload portion of the packet. The UE would know which of the wireless paths the packet was received over, and based on that knowledge can predict the information in the compressed header. This can include retrieving the block labels and resolving the coding coefficients for the blocks as a function of the path. In an embodiment, the UE may use a known property of the received traffic or its path to determine the path and/or predict the information in the header. The UE uses the retrieved coding coefficients to decode the blocks.

Figure 6:
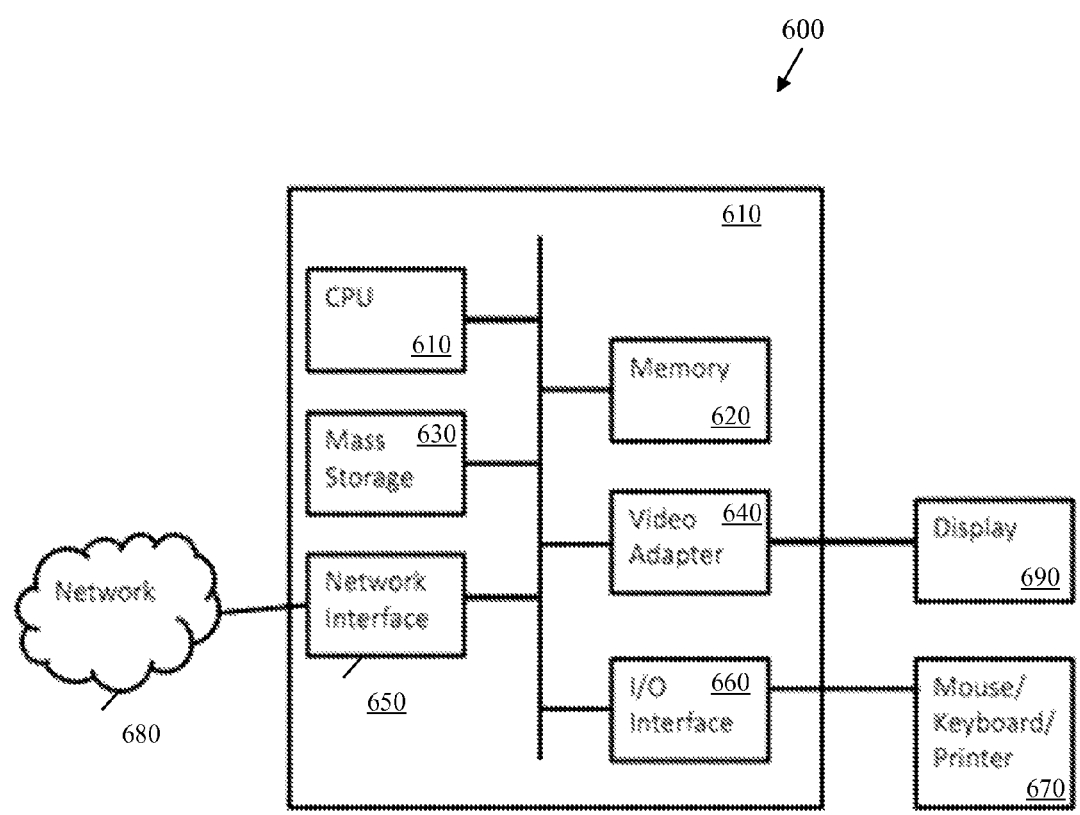
FIG. 6 is a diagram of a processing system that can be used to implement various embodiments.

FIG. 6 is a block diagram of a processing system 600 that can be used to implement various embodiments. For instance the processing system 600 can be part of a UE, such as a smart phone, tablet computer, a laptop, or a desktop computer. The processing system can also be part of a network component, such as the agent or the node in the schemes above. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 660 connected to a bus. The bus may be one or more of any type of several bus architectures including a memory bus or memory controller, a peripheral bus, a video bus, or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 660 provide interfaces to couple external input and output devices to the processing unit. As illustrated, examples of input and output devices include a display 690 coupled to the video adapter 640 and any combination of mouse/keyboard/printer 670 coupled to the I/O interface 660. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network component, the method comprising:
    adding, by the network component to a header in a packet, at least one block label corresponding to at least one block of data in a payload portion of the packet;
    encoding the payload portion of the packet using an online network coding scheme based on an expected path of a plurality possible paths for transmitting the packet from the network component to a destination network device, thereby producing an encoded packet; and
    transmitting the encoded packet to the destination network device.

2. The method of claim 1 further comprising indicating in the header a total number of blocks of data in the payload portion of the packet.

3. The method of claim 1 further comprising adding to the header a base field indicating a last fully decoded block at the a user equipment (UE).

4. The method of claim 3, wherein the block label represents a consecutive differential value with respect to the base field.

5. The method of claim 1 further comprising adding to the header a source port and a destination port.

6. The method of claim 1, wherein the encoded packet is transmitted from the network component to an access node serving a user equipment (UE).

7. The method of claim 6 further comprising generating the block label as a function of the expected path of the packet.

8. The method of claim 6 further comprising adding to the header a coding coefficient corresponding to the block of data in the encoded payload portion of the packet.

9. The method of claim 8 further comprising generating the coding coefficient as a function of the expected path of the packet.

10. The method of claim 8 further comprising generating the coding coefficient as a function of the block label of the block of data or a function of a differential value between consecutive block labels.

11. The method of claim 8 further comprising generating the coding coefficient using a random function generator based on the expected path of the packet.

12. The method of claim 8 further comprising:
    generating a second coding coefficient as a function of a second expected path between a second access node and the UE;
    encoding the payload portion using the second coding coefficient, thereby producing a second encoded packet; and
    transmitting, to the second access node, the second encoded packet.

13. The method of claim 1 further comprising adding to the payload portion of the packet, start and end times for transmitting the at least one block.

14. The method of claim 1, wherein encoding the payload portion of the packet using the online network coding scheme based on the expected path of the packet comprises encoding the packet based on a last hop to a the UE.

15. The method of claim 1, further comprising:
    adding, by the network component to a second header in a second packet, at least one second block label corresponding to at least one block of data in a second payload portion of the second packet;
    encoding the second payload portion of the second packet using a second online network coding scheme, different from the online network coding scheme, based on a second expected path of the plurality possible paths for transmitting the second packet from the network component to the destination network device, thereby producing a second encoded packet; and
    transmitting the second encoded packet to the destination network device.

16. A network component comprising:
    at least one processor; and
    a non-transitory computer readable storage medium storing programming for execution by the at least one processor, the programming including instructions to:
        add, to a header in a packet, at least one block label corresponding to at least one block of data in a payload portion of the packet;
        encode the payload portion of the packet using an online network coding scheme based on an expected path of a plurality possible paths for transmitting the packet from the network component to a destination network device, thereby producing an encoded packet; and
        transmit the encoded packet to the destination network device.

17. The network component of claim 16, wherein the network component is an intermediary agent node positioned between a source of the packet and an access node serving a user equipment (UE).

18. The network component of claim 16, wherein the programming includes further instructions to add to the payload portion of the packet, start and end times for transmitting the at least one block.

19. The network component of claim 16, wherein the programming includes further instructions to add to the header a coding coefficient corresponding to the block of data in the encoded payload portion of the packet, and wherein at least one of the coding coefficient and the block label is a function of the expected path of the packet.

20. The network component of claim 19, wherein the programming includes further instructions to generate the coding coefficient as a function of the expected path of the packet.

21. The network component of claim 19, wherein the programming includes further instructions to generate the coding coefficient as a function of the block label of or a function of a differential value between consecutive block labels.

22. The network component of claim 19, wherein the programming includes further instructions to generate the coding coefficient using a random function generator based on the expected path of the packet.

23. The network component of claim 19, wherein the programming includes further instructions to:
generate a second coding coefficient as a function of a second expected path between a second access node and a the UE;
encode the payload portion using the second coding coefficient, thereby producing a second encoded packet; and
transmit, to the second access node, the second encoded packet.

24. The network component of claim 16, wherein the programming includes further instructions to indicate in the header a total number of blocks of data in the payload portion of the packet.

25. The network component of claim 16, wherein the programming includes further instructions to add to the header a base field indicating a last fully decoded block at a the UE.

26. The network component of claim 25, wherein the block label represents a consecutive differential value with respect to the base field.

27. The network component of claim 16, wherein the programming includes further instructions to add to the header a source port and a destination port.

28. The network component of claim 16, wherein the instructions to encode the payload portion of the packet using the online network coding scheme based on the expected path of the packet comprise instructions to encode the packet based on a last hop to a the UE.

* * * * *